United States Patent [19]

Shinohara

[11] Patent Number: 5,465,882
[45] Date of Patent: Nov. 14, 1995

[54] CARRIER FOR SCOOTER-TYPE VEHICLE

[75] Inventor: Kazunori Shinohara, Shizuoka, Japan

[73] Assignee: Suzuki Kabushiki Kaisha, Shizuoka, Japan

[21] Appl. No.: 125,739

[22] Filed: Sep. 24, 1993

[30] Foreign Application Priority Data

Dec. 18, 1992 [JP] Japan ................................. 4-338898
Feb. 4, 1993 [JP] Japan ................................. 5-017678

[51] Int. Cl.⁶ ......................................................... B62J 7/04
[52] U.S. Cl. .......................... 224/39; 224/32 A; 180/219; 180/225
[58] Field of Search ........................... 224/282, 30 R, 224/32 R, 39, 42.07, 42.03 A, 309, 315, 317, 324, 327, 42.11, 42.44, 32 A, 38, 39; 180/219, 311, 225; 280/288.4

[56] References Cited

U.S. PATENT DOCUMENTS

| 2,537,441 | 1/1951 | Burri ................................. 224/32 |
| 3,910,471 | 10/1975 | Niemann ........................... 224/39 |
| 4,174,796 | 11/1979 | Nakamura ......................... 224/39 |
| 4,175,630 | 11/1979 | Fleisher et al. .................. 180/225 |
| 4,268,048 | 5/1981 | Teraoka et al. ................. 224/42.13 |
| 4,349,138 | 9/1982 | Bruhn ............................ 224/30 R |
| 4,440,330 | 4/1984 | Goodman ........................ 224/32 A |
| 4,441,574 | 4/1984 | Kohyama ........................ 224/32 A |
| 4,469,256 | 9/1984 | Mc Ewen ........................ 224/32 A |
| 4,480,773 | 11/1984 | Krauser ........................ 224/32 A |
| 4,715,465 | 12/1987 | Takahashi et al. ................ 180/225 |
| 4,773,573 | 9/1988 | Doveri .......................... 224/32 A |
| 4,802,682 | 2/1989 | Yasuji .......................... 180/219 |
| 4,826,057 | 5/1989 | Yamada ......................... 224/32 A |
| 5,044,646 | 9/1991 | Iiga et al. ...................... 180/225 |
| 5,094,315 | 3/1992 | Taki et al. ...................... 180/219 |

FOREIGN PATENT DOCUMENTS

| 0262912 | 4/1988 | European Pat. Off. . |
| 0482610 | 4/1992 | European Pat. Off. . |
| 708289 | 7/1941 | Germany ..................... 224/38 |
| 863761 | 7/1949 | Germany ..................... 180/225 |
| 86059 | 8/1957 | Netherlands ................ 224/38 |

Primary Examiner—Henry J. Recla
Assistant Examiner—Gregory M. Vidovich
Attorney, Agent, or Firm—Finnegan, Henderson, Farabow, Garrett & Dunner

[57] ABSTRACT

A scooter-type vehicle, in which a fuel tank is arranged at a rear side portion of a rider's seat and a fuel inlet port of the fuel tank is positioned outside a rear side outer cover of a vehicle body, has a carrier on which baggage is to be mounted. The carrier is disposed above the outer cover and the carrier includes a fixing frame portion and rotatable frame portion rotatable with respect to the fixing frame portion. The rotatable frame portion is positioned directly above the fuel inlet port.

7 Claims, 14 Drawing Sheets 5,465,882

CARRIER FOR SCOOTER-TYPE VEHICLE

BACKGROUND OF THE INVENTION

The present invention relates to a carrier for a scooter-type vehicle.

In many scooter-type vehicles, a compartment for containing a helmet, etc. is provided directly below a rider's seat to effectively make use of the scarce space available. The fuel tank is provided behind this compartment. In some scooter-type vehicles, a carrier for lodging baggage is provided on the vehicle body cover behind the seat.

In some scooter-type vehicles, the fuel inlet of the fuel tank is located in the inner back wall of the above-mentioned compartment and the seat is of a type which can be opened and closed and has a lock mechanism. The fuel inlet is covered by the seat.

In other scooter-type vehicles, the fuel inlet of the fuel tank is provided in the rear vehicle body cover. It is covered by a fuel lid capable of being opened and closed and having a lock mechanism.

Further, there are scooter-type vehicles in which the fuel inlet is exposed above the rear vehicle body cover, and is closed by a cap having a lock mechanism.

However, when the fuel inlet is located in the inner back wall of the compartment below the seat, there is a fear that the baggage inside the compartment may be stained by fuel spilt during refueling. In the case of such fuel lid which can be opened and closed, provided on the rear vehicle body cover, the mounting structure is rather complicated, and the number of parts increases, resulting in an increase in assembling working and production cost.

In view of the above problems, it is desirable that a structure in which the fuel inlet provided on the rear vehicle body cover is closed by a cap having a lock mechanism. However, this structure involves a problem when a carrier is provided above the rear vehicle body cover.

FIG. 16A shows a structure in which a fuel inlet 4a, which is closed by a cap 3a having a lock mechanism, is provided in an upper frame cover 2, which constitutes a rear vehicle body cover behind a seat 1. In this structure, a carrier 5a must rearwardly extend so as to avoid blocking the fuel inlet 4a. This arrangement makes it rather difficult for the baggage to be loaded directly above the cap 3a. Moreover, the carrier 5a extending rearwards is rather unbalanced in terms of vehicle design.

In the case of a structure as shown in FIG. 16B, it is necessary for a part of a carrier 5b to be widened in order that a fuel inlet 4b is not blocked. Thus, a relatively small piece of baggage cannot be loaded directly above a cap 3b.

In either case, this is rather inconvenient because the baggage has to be removed from the carrier each time fuel is refilled. Further, the cap having a lock mechanism complicates the structure of the portion around the fuel inlet, resulting in an increase in cost. In addition, the rider has to carry a key for the lock mechanism with him.

SUMMARY OF THE INVENTION

The present invention was conceived in view of the above problems of the prior art, and it is accordingly an object of the present invention to provide a carrier for a scooter-type vehicle which makes it possible to easily perform refueling without removing baggage from the carrier.

Another object of this invention is to provide a carrier for a scooter-type vehicle which does not require a complicated lock mechanism for the fuel inlet.

A further object of this invention is to provide a carrier for a scooter-type vehicle which can carry small objects in a stable manner and which enables the carrier space to be effectively used.

A still further object of the present invention is to provide a carrier for a scooter-type vehicle which has a wide baggage carrying area including an area directly above the location of the fuel inlet.

These and other objects can be achieved according to the present invention by providing a carrier for a scooter-type vehicle in which a fuel tank is arranged at a rear side portion of a rider's seat and a fuel inlet port of the fuel tank is positioned outside a rear side outer cover of a vehicle body, wherein a carrier on which baggage is to be mounted is disposed above the outer cover and the carrier includes a rotatable portion positioned directly above the fuel inlet port.

In one preferred embodiment, the carrier further comprises a carrier base as a fixing frame portion to be fixed to the outer cover of the vehicle body and a rotatable frame portion rotatably connected to the carrier base.

The carrier base has a U-shaped structure having both ends secured to the outer cover and a central portion to which a hinge means is mounted and the rotatable frame portion comprises a first carrier part rotatably engaged with the hinge means of the carrier base and having end portions bent downward in an assembled state and a second carrier part having a U-shaped frame structure secured to the first carrier part, the second carrier part having distal ends bent downwardly so that when the carrier is mounted on the outer cover of the vehicle body, the distal ends abut the outer cover. The rotatable frame portion further includes a third carrier part secured to a lower side surface of the second carrier part at portions near the distal ends thereof, the third carrier part having end portions bent downward in a state of the carrier being attached to the vehicle body, and a fourth carrier part having a U-shaped structure secured to the bent end portions of the first and third carrier parts.

The first, second, third and fourth carrier parts are positioned in different levels when the carrier is mounted to the outer cover of the vehicle body.

In another embodiment, the carrier comprises a fixing frame portion to be secured to the outer cover of the vehicle body and a rotatable frame portion rotatable with respect to the fixing frame portion.

The fixing frame portion comprises a U-shaped carrier part having end portions bent downward in an assembled state of the carrier, the bent portions being secured to the outer cover of the vehicle body when the carrier is mounted to the vehicle body and a pair of carrier parts secured to the U-shaped carrier part at portions near the end portions thereof so as to extend downward in a state that the carrier is mounted to the vehicle body and the rotatable frame portion is rotatably mounted to the paired carrier parts of the fixing frame portion.

The rotatable frame portion has a U-shaped structure having both ends formed in the shape of rings through which the paired carrier parts are fitted, respectively, rotatably.

The carrier further comprises a support carrier part having a T-shaped structure, the support carrier part having a horizontal bar portion to be secured to the U-shaped fixing frame portion and a vertical bar portion to be secured to the outer cover of the vehicle body. An elastic engaging piece is fitted to the horizontal bar portion of the T-shaped support carrier part, the engaging piece being provided with a recess into which a central portion of the U-shaped rotatable frame portion is engaged.

The fixing frame portion constitutes an outer frame member and the rotatable frame portion constitutes an inner frame member, the inner frame member being positioned in a level lower than that of the outer frame member when the carrier is mounted to the vehicle body.

In the present invention, having the above-described construction, the carrier is rotatably arranged directly above the fuel inlet, so that refueling can be easily performed without removing baggage from the carrier. Further, the cap of the fuel inlet does not require a complicated lock mechanism.

DESCRIPTION OF THE PREFERRED EMBODIMENTS

Embodiments of the present invention will now be described with reference to the drawings.

Figure 1:
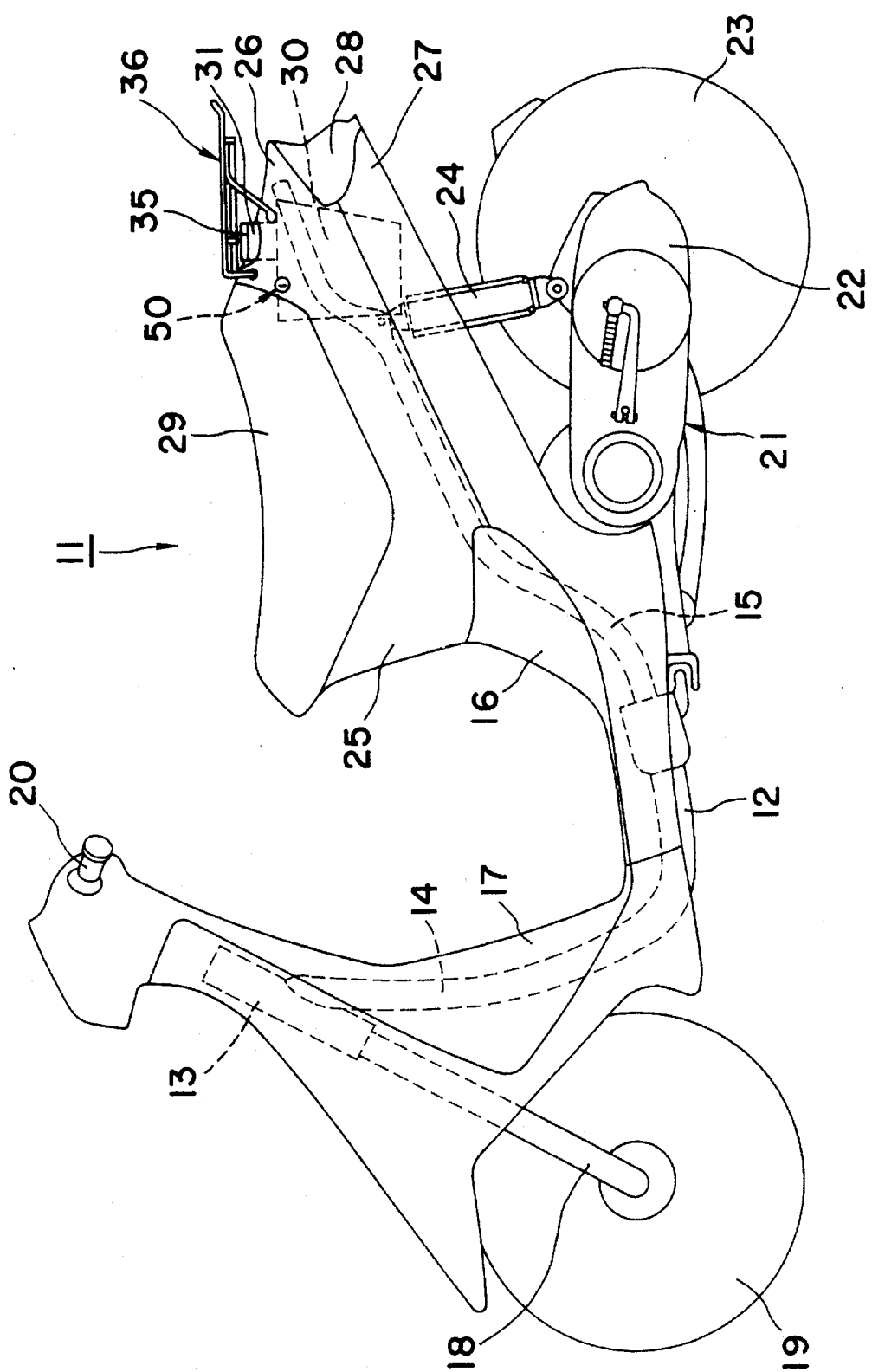
FIG. 1 is a left-hand side view of a scooter-type vehicle addapted to the present invention.

FIG. 1 is a left-hand side view of a scooter-type vehicle to which this invention is applied.

Referring to FIG. 1, this scooter-type vehicle 11 has a vehicle body frame 12, which comprises a down tube 14 extending obliquely downward from a head pipe 13, and right and left rear frames 15 fastened to the front end of the down tube 14 and extending rearwardly and upwardly. The rear frames 15 are bent in the middle and then raised to further extend rearwardly and upwardly.

A rear leg shield 16 is provided above and near the joint section between the down tube 14 and the rear frames 15. A leg shield cover 17 is raised from the front end of the rear leg shield 16.

The head pipe 13 is located in the leg shield cover 17. The head pipe 13 supports a front fork 18, at the lower end of which a front wheel 19 is held. Numeral 20 indicates a handlebar.

The vehicle is further provided with an engine unit serving as the power unit. The engine unit 21 includes an engine and a transmission case 22 rearwardly extending from one side of the engine. A rear wheel 23, serving as the driving wheel, is held at the rear end of the transmission case 22. The transmission case 22 also serves as a swing arm, and is resiliently supported by the rear frames 15 through the intermediation of rear shock absorbers 18.

An upper frame cover 26, formed as an integral unit branching to the right and left or as separate components and constituting a part of the vehicle body cover 25, is provided in such a way as to surround the upper sections of the rear frames 15. Right and left lower side covers 27, formed as separate components, are provided below the upper frame cover 26 as a rear outer cover.

A rear combination lamp 28 is provided at the rear end of the joint sections between the upper frame cover 26 and the lower side covers 27. A seat 29 of the type which can be opened and closed is provided on top of the upper frame cover 26.

A fuel tank 30 is provided within the space defined by the rear end of the seat 29 and the upper frame cover 26, in such a way as to be held between the rear frames 15. A fuel inlet 31 is provided on top of the fuel tank 30 in such a way as to be exposed on the upper frame cover 26 behind the seat 29.

The fuel inlet 31 is mounted on a mounting section of the upper frame cover 26 by means of a packing 32. A drain hole 33 is provided at the bottom of the mounting section, a drain hose 34 being attached to this drain hole. The fuel inlet 31 is closed by screwing a fuel cap 35 onto it.

A carrier 36 for loading the baggage is provided above the upper frame cover 26 behind the seat 29.

Figure 2:
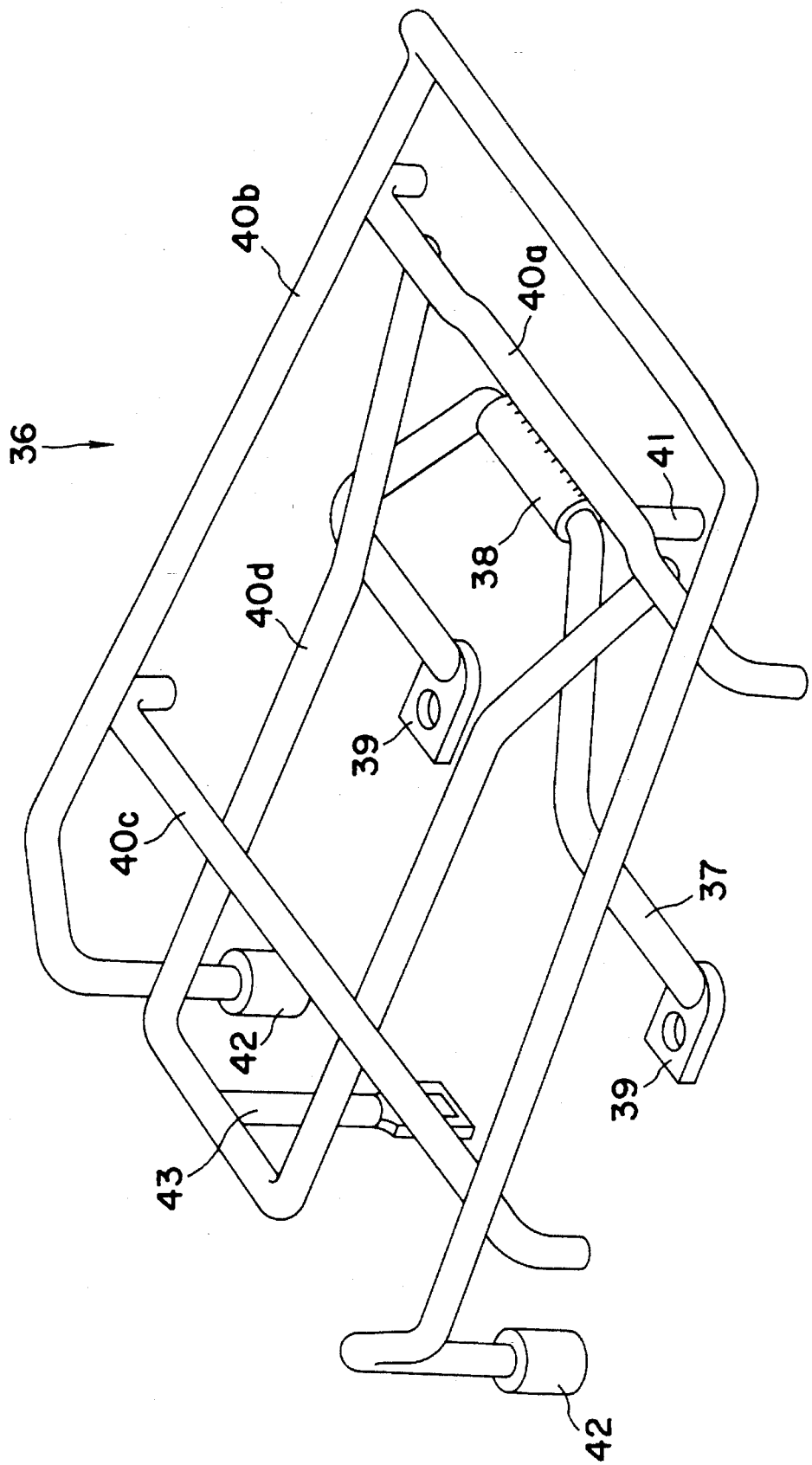
FIG. 2 is a perspective view of a carrier according to a first embodiment of the present invention.
Figure 3:
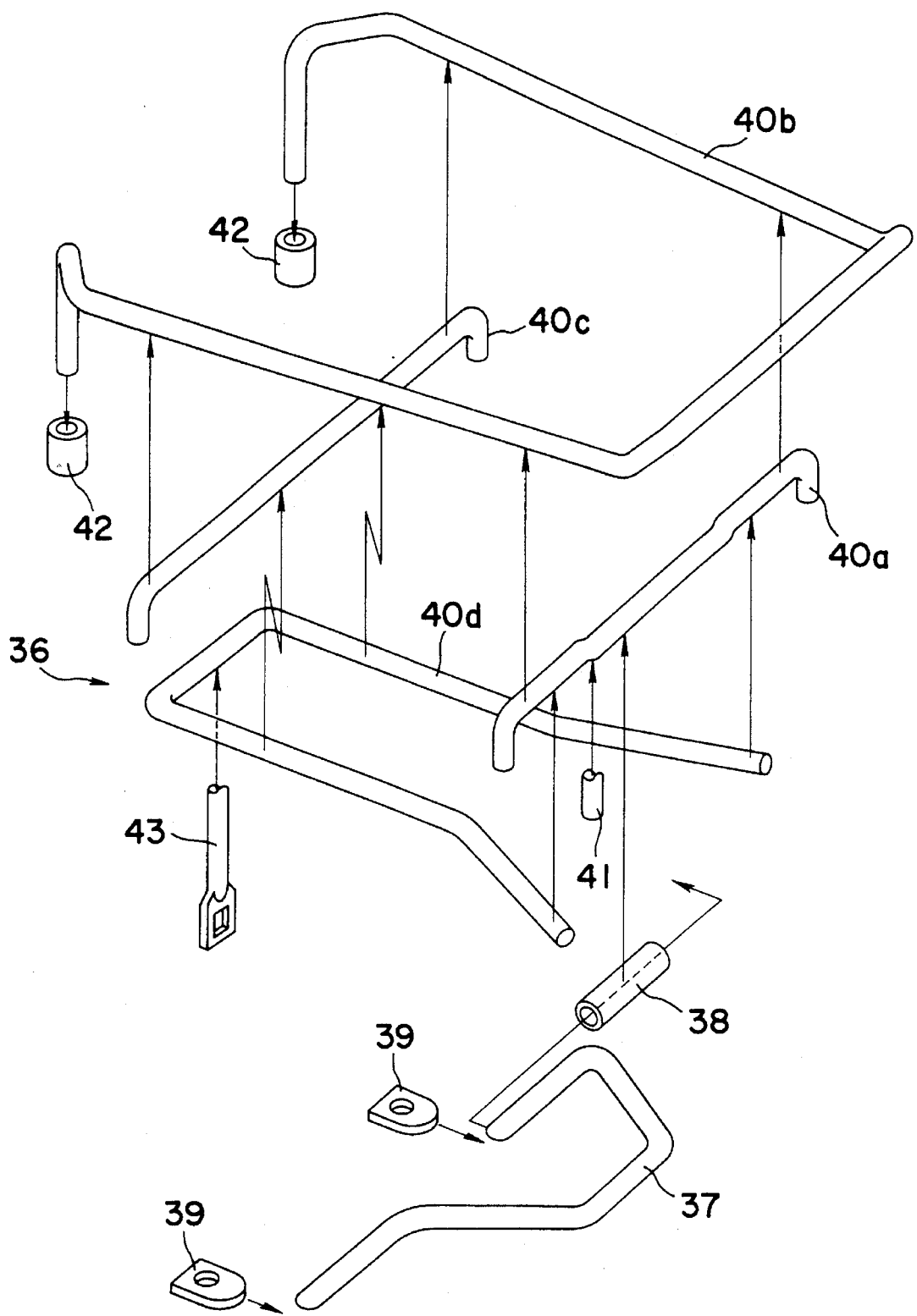
FIG. 3 is a view showing carrier parts before fixed as the carrier of FIG. 2.

FIG. 2 shows a carrier 36 according to an embodiment of the present invention, and as shown in FIG. 3, the carrier 36 is composed of a plurality of carrier parts.

Referring to FIGS. 2 and 3, a carrier base 37 has a hinge section 38 in the form of a pipe or the like, which is rotatably arranged on the carrier base 37 and positioned substantially in the middle of it. Pedestals 39 for bolt fastening are provided at both ends of the carrier base 37.

The hinge section 38 on the carrier base 37 is joined to the middle portion of a carrier part 40a, which is rotatable with respect to the carrier base 37. Both end portions of the carrier part 40a are downwardly bent into an L-shape so as to facilitate the binding of a cord or the like for securing the baggage in position. Further, a carrier stopper 41 is attached to the lower side of the carrier part 40a, at a position near its center.

A carrier part 40b is provided on top of the carrier part 40a. The carrier part 40b has substantially a U-shape structure and extends along the longitudinal dimension of the vehicle 11, and both end portions thereof are bent downwardly in the front sections thereof. Cushioning members 42 made of rubber or the like are attached to these end portions.

A carrier part 40c is provided under the carrier part 40b and extends across the front sections thereof for reinforcement. As in the carrier part 40a, both end portions of the carrier part 40c are bent downwardly into an L-shape so as to facilitate the binding of a cord or the like for securing the baggage in position. A carrier part 40d is joined to the lower sides of the carrier parts 40a and 40c. A downwardly extending carrier striker 43 is joined to the carrier part 40d, at a position approximately at its center and near the seat.

Namely, the carrier of this embodiment has the carrier base with a U-shaped structure having both ends secured to the outer cover 26 and a central portion to which a hinge means 38 is mounted. The rotatable frame portion comprises a first carrier part 40a rotatably engaged with the hinge means 38 of the carrier base 37 and having end portions bent downward in an assembled state and a second carrier part 40b having a U-shaped frame structure secured to the first carrier part 40a. The second carrier part 40b has distal ends bent downwardly so that when the carrier 36 is mounted on the outer cover 26 of the vehicle body, the distal ends abuts against the outer cover. The rotatable frame portion further includes a third carrier part 40c secured to a lower side surface of the second carrier part 40b at portions near the distal ends thereof, the third carrier part 40c having end portions bent downward in a state of the carrier 36 being attached to the vehicle body, and a fourth carrier part 40d having a U-shaped structure secured to the bent end portions of the first and third carrier parts 40a and 40c.

Figure 4:
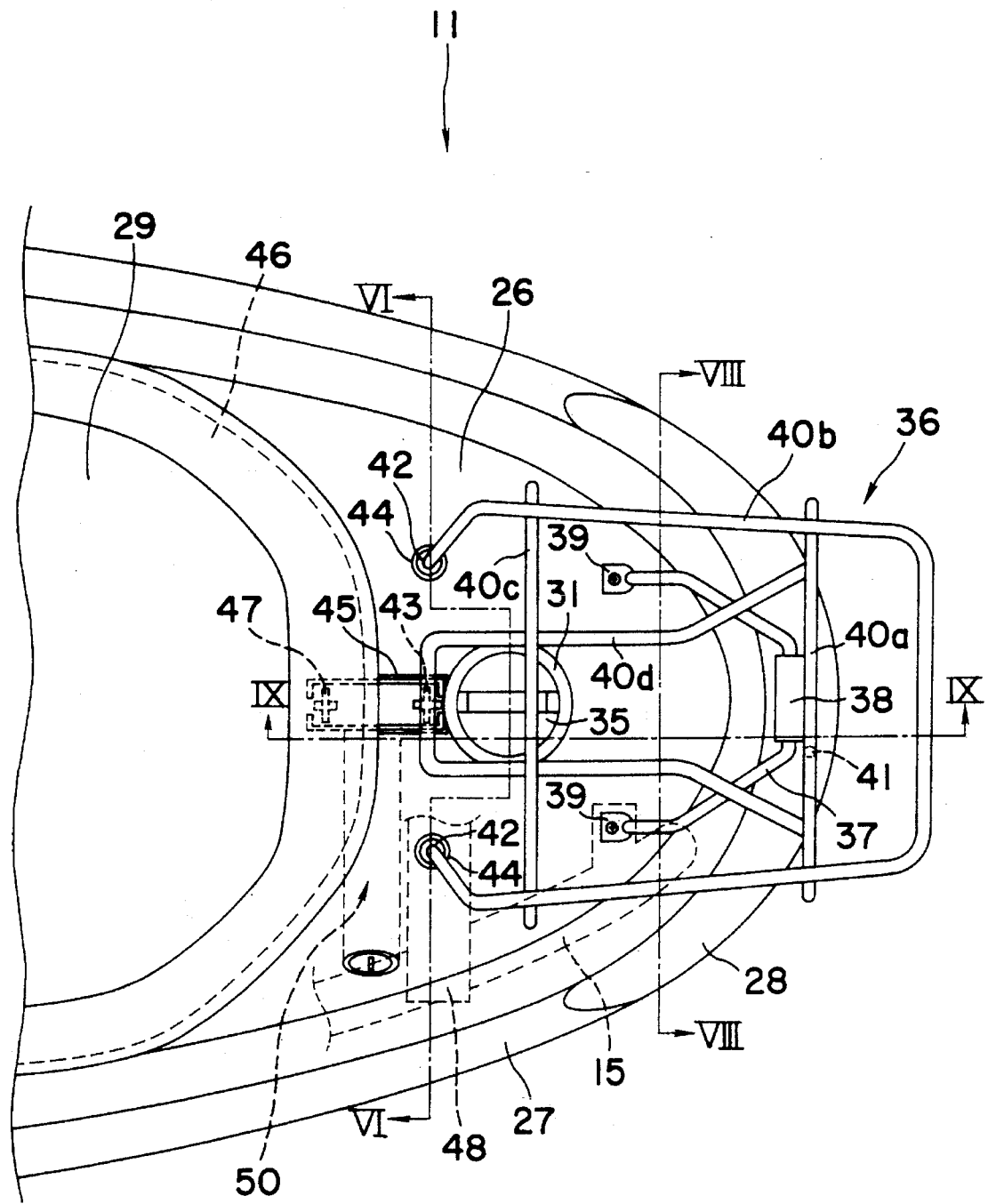
FIG. 4 is a plan view of the rear section of a scooter-type vehicle, showing an example of the way that the carrier of FIG. 2 is mounted.
Figure 5:
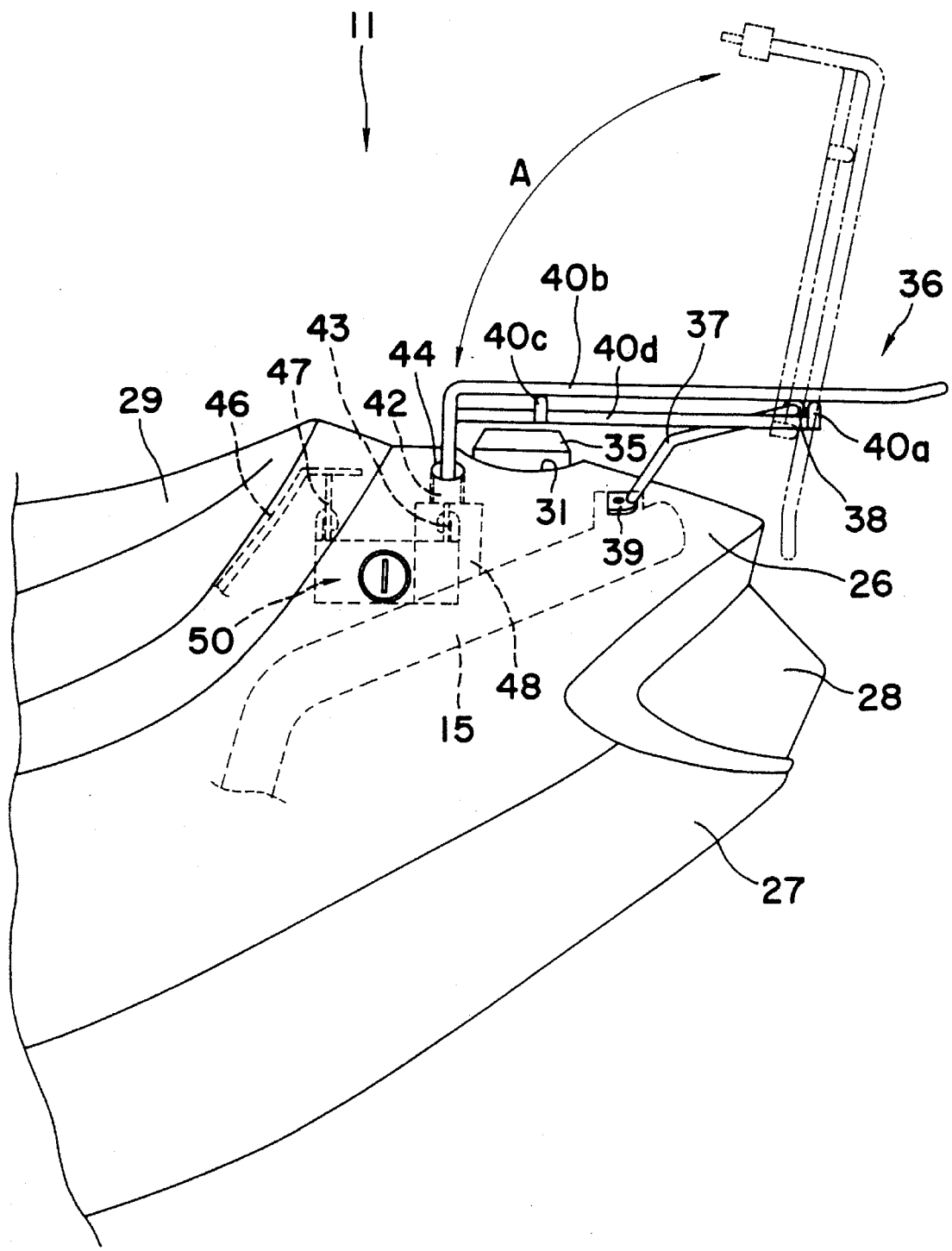
FIG. 5 is a left-hand side view of FIG. 4.

FIGS. 4 and 5 are a plan view and a left-hand side view, respectively, of the rear section of the scooter-type vehicle 11, showing an example of the way that the carrier 36, described above, is mounted.

Referring to FIGS. 4 and 5, cushioning-member holes 44 for receiving the cushioning members 42 of the carrier 36 and a striker hole 45 for receiving the carrier striker 43 are provided on the upper frame cover 26 behind the seat 29.

A seat striker 47 is arranged in the rear section of a seat base 46 provided under the seat 29.

Figure 6:
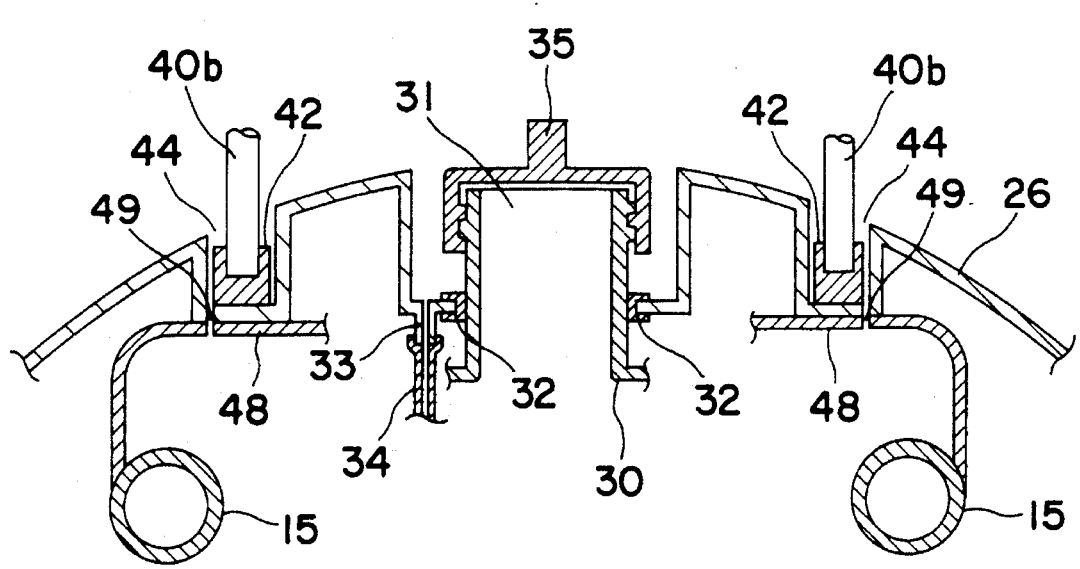
FIG. 6 is a sectional view taken along line VI—VI of FIG. 4.

FIG. 6 is a sectional view taken along line VI—VI of FIG. 4. The bottom surfaces of the cushioning-member holes 44 are in contact with a stay 48 extending across the rear frames 15. Draining holes 49 are provided at the bottom of the cushioning-member holes 44.

Figure 7:
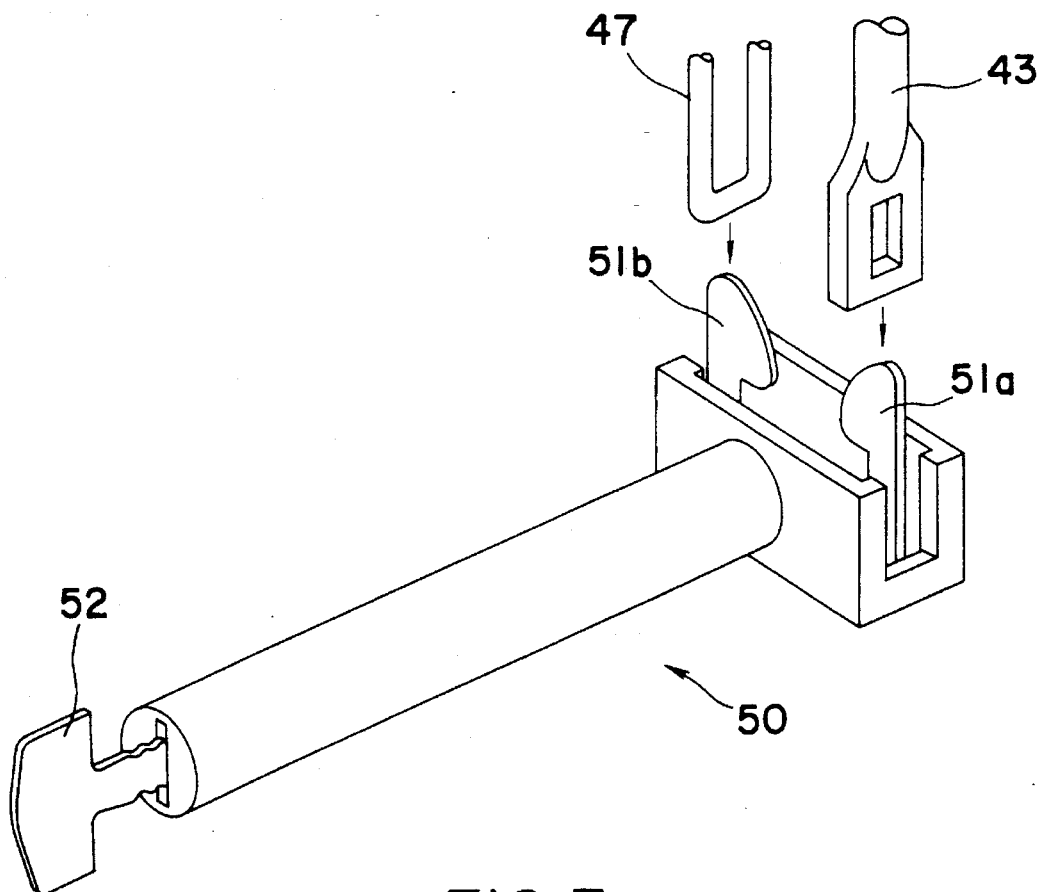
FIG. 7 is a perspective view of a lock mechanism for the carrier.

A lock mechanism 50 as shown in FIG. 7 is provided inside the upper frame cover 26 behind the seat 29. The lock mechanism 50 has hooks 51a and 51b, which are engaged with the carrier striker 43 and the seat striker 47, respectively. The hooks 51a and 51b of the lock mechanism 50 can be separately unlocked with a single key 52.

Figure 8:
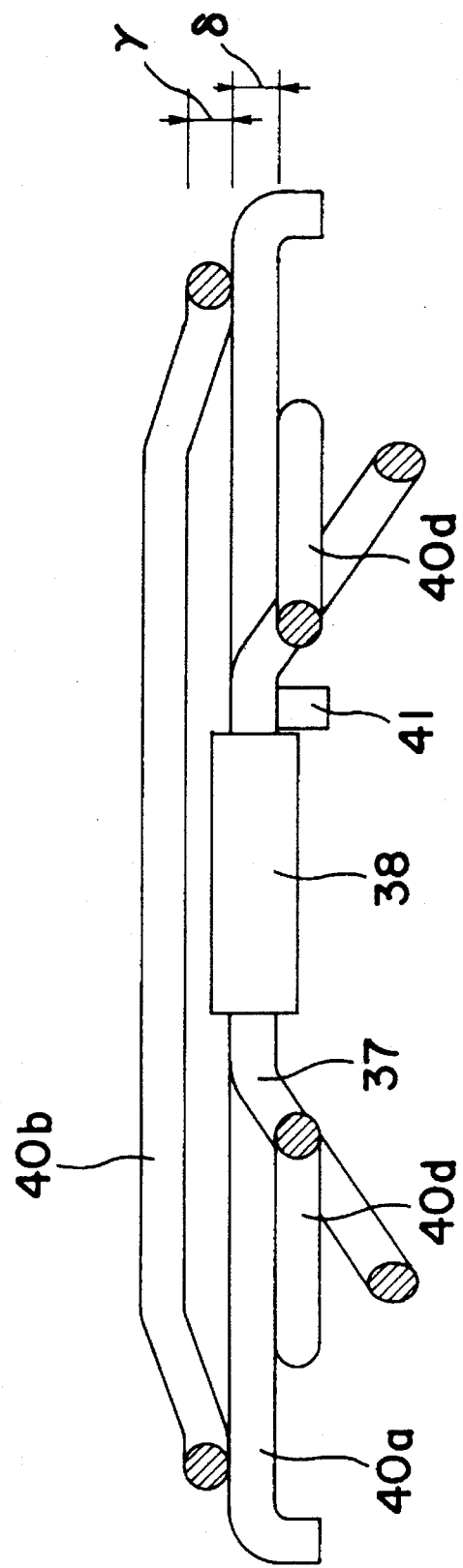
FIG. 8 is a sectional view taken along the line VIII—VIII of FIG. 4.
Figure 9:
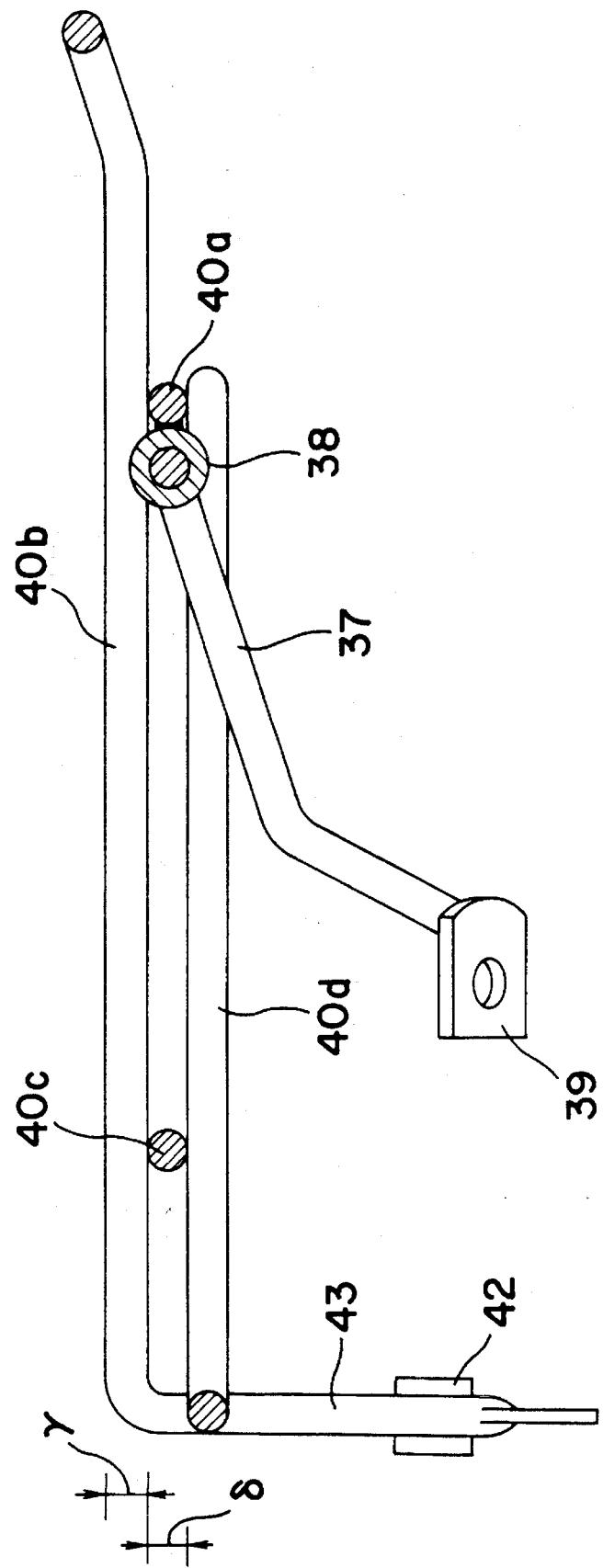
FIG. 9 is a sectional view of the carrier taken along the line IX—IX of FIG. 4.

FIGS. 8 and 9 are sectional views, taken along lines VIII—VIII and IX—IX, respectively, of the carrier 36 shown in FIG. 4.

Next, the operation of this embodiment will be described.

The carrier 36, which is composed of the carrier base 37, the pedestals 39, the carrier parts 40a through 40d, the carrier stopper 41 and the carrier striker 43, is assembled, for example, by joining metal bars together and welding them into a rigid structure.

As shown in FIG. 4, the carrier 36 is arranged in such a way that the carrier part 40c or 40d extends over the fuel cap 35, thereby making it unnecessary to provide the lock mechanism 50 for the fuel cap 35. Further, since there is no need for the carrier 36 to be designed to prevent it from being in the way of the fuel cap 35, it is possible to form the carrier 36 in a free layout so that even a small piece of the baggage can be carried.

Further, as shown in FIGS. 8 and 9, the carrier 36 is formed to have differences γ and δ in level. These differences in level serve as stoppers along lateral and longitudinal dimensions for a small piece of the baggage.

The pedestals 39, welded to both ends of the carrier base 37, may be fastened to the upper frame cover 26 by means of bolts, thereby securing the carrier 36 onto the vehicle 11. However, to obtain higher strength for supporting a heavy load of the baggage, it is desirable that the pedestals 39 be fastened to the rear frames 15 arranged below the upper frame cover 26.

The carrier part 40a is welded onto the hinge section 38, which is rotatably arranged on the carrier base 37, the other carrier parts 40b through 40d being welded to the carrier part 40a. The carrier 36 is rotatable as indicated by arrow A in FIG. 5. Due to this rotatable structure of the carrier 36, refuelling can be easily performed without removing the baggage from the carrier 36.

At a certain angle of rotation of the carrier 36, the carrier stopper 41, attached to the carrier part 40a, abuts against the carrier base 37, thereby hindering further rotation of the carrier 36. Therefore, there is no need for the rider to hold the carrier 36 during refuelling.

The cushioning members 42, attached to the bent ends of the carrier part 40b, are inserted with some play into the cushioning-member holes 44 when the carrier 36 is set in the horizontal position. Since the bottoms of the cushioning-member holes 44 are in contact with the stay 48 extending across the rear frames 15, they can sufficiently support the load of the front section of the carrier 36.

Further, when the carrier 36 is set in the horizontal position, the carrier striker 43, attached to the carrier part 40d, is inserted into the striker hole 45, and engaged with the hook 51a of the lock mechanism 50, provided inside the upper frame cover 26, thereby locking the carrier 36.

The lock mechanism 50 also serves as a seat lock. The seat striker 47, provided in the rear end portion of the seat base 46, engages with the hook 51b of the lock mechanism 50, thereby locking the seat.

By turning the key 52 to the right, the hook 51a of the lock mechanism 50 is unlocked and by turning the key 52 to the left, the hook 51b of the lock mechanism 50 is unlocked. This arrangement is convenient because the rider can separately lock or release the carrier 36 and the seat 29 with a single key.

While in the above-described embodiment the carrier is opened by rearwardly rotating it, it is also possible to design it to be opened by laterally rotating it.

Further, while in the above embodiment the fuel inlet 31 is exposed on the upper frame cover 26, it is also possible for the fuel inlet 31 to be closed by an opening/closing-type fuel lid, which is covered by the carrier 36.

The carrier according to the present invention is not limited to the application of the scooter-type vehicle shown in FIG. 1 and is applicable to other types of vehicles provided with a fuel tank having a fuel supply inlet exposed outside a rear side outer cover at the rear portion of a seat.

A second embodiment according to the present invention will be described hereunder with reference to FIGS. 10–15.

Figure 10:
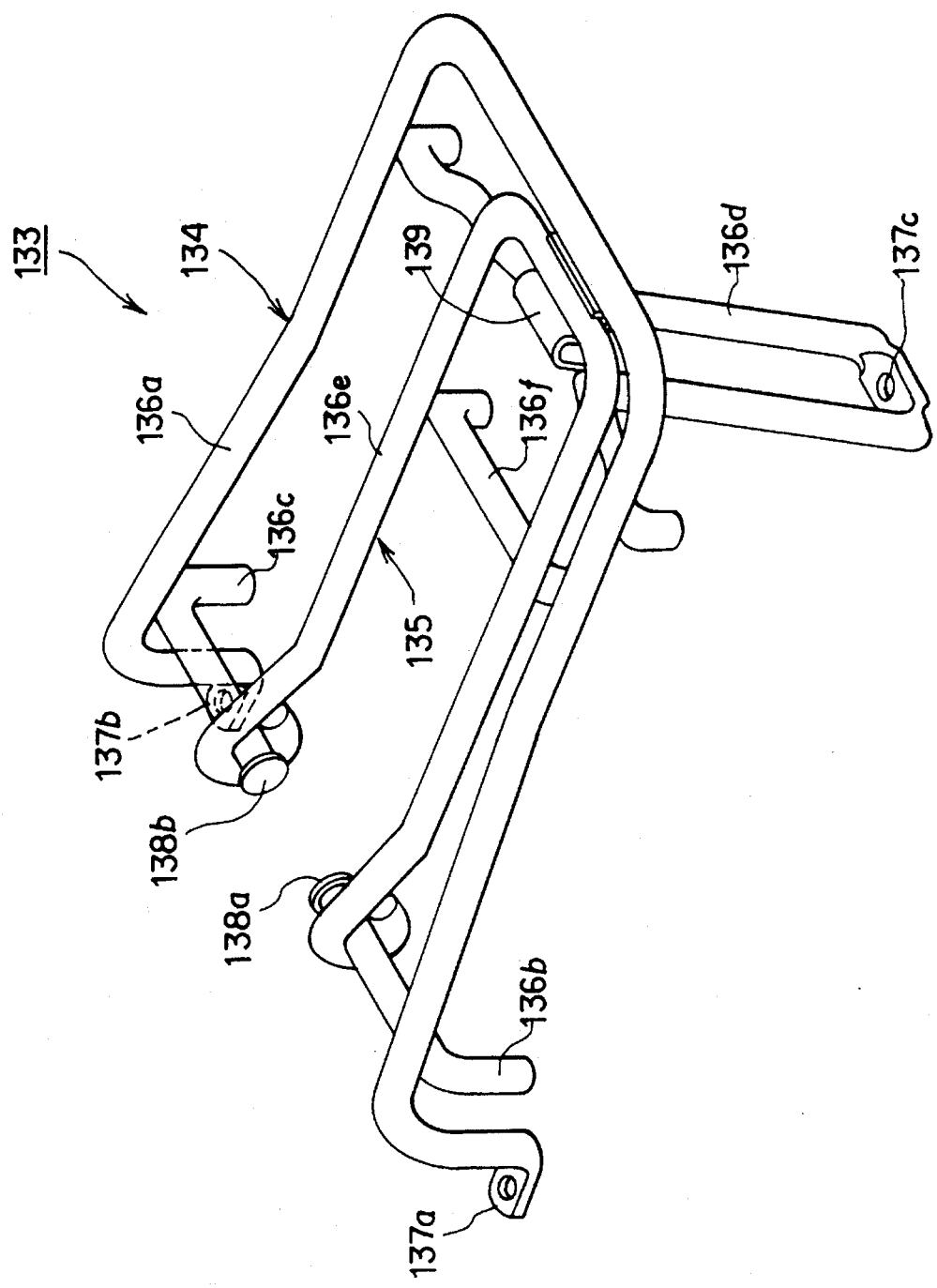
FIG. 10 is a perspective view of a carrier according to a second embodiment of the present invention.

FIG. 10 shows a perspective view of a carrier applicable to a scooter-type vehicle according to the present invention. In this embodiment, the carrier is applied to a scooter-type vehicle in which a fuel tank 129 is located in a rear side frame cover 126 as an outer cover of a seat 127 and supported between rear frames 115, and a fuel inlet 130 of the fuel tank 129 is exposed outside the outer cover 126.

Figure 14:
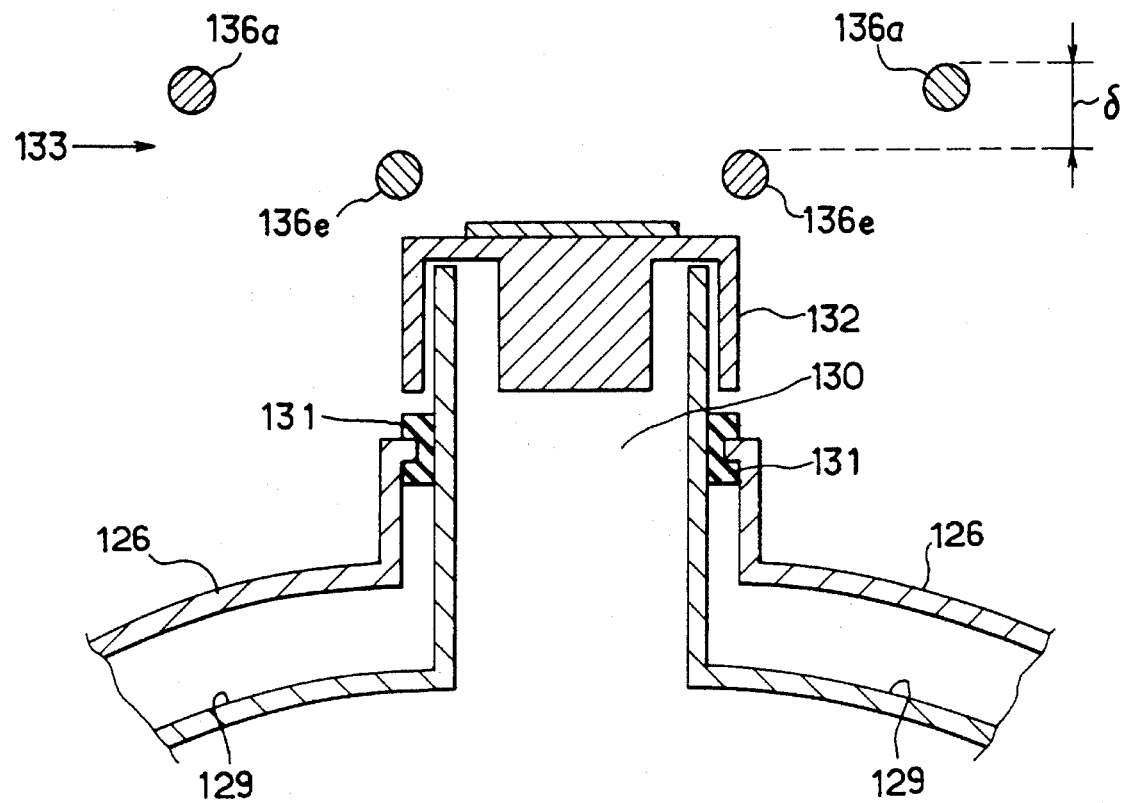
FIGS. 14 and 15 are sectional views taken along the lines XIV—XIV and XV—XV in FIG. 12, respectively.

As shown in FIG. 14, the fuel inlet 130 is liquid-tightly secured to the outer cover 126 through a packing 131. The open end of the fuel inlet 130 is closed by a fuel cap 132 provided with a lock mechanism, not shown.

The carrier 133 of FIG. 10 is disposed above the outer cover 126. The carrier 133 of FIG. 10 is constructed by elements or parts shown in FIG. 11.

Figure 11:
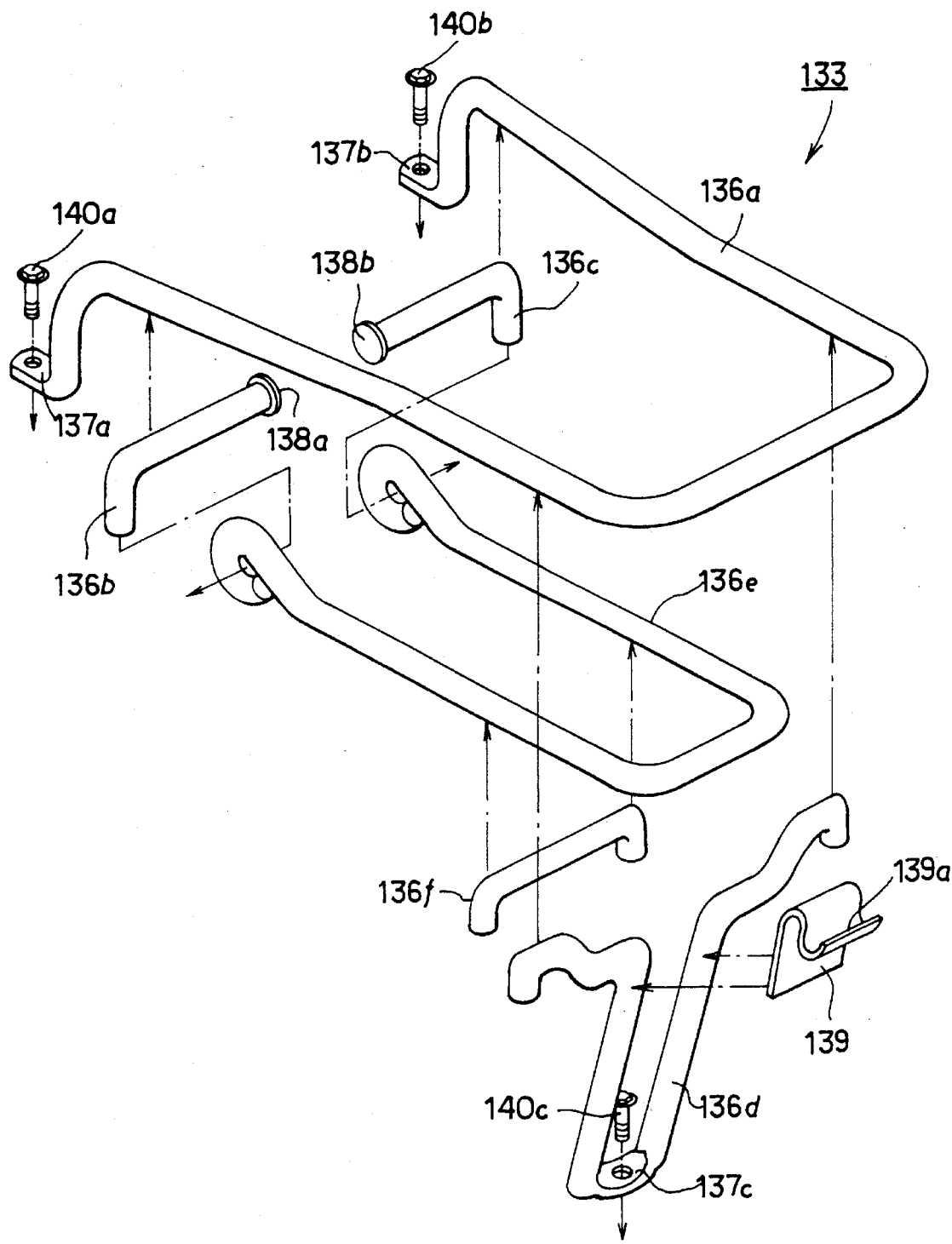
FIG. 11 is a view showing parts before fixed as the carrier shown in FIG. 1.

Referring to FIGS. 10 and 11, the carrier 133 comprises a fixed frame portion 134 and a rotatable frame portion 135, which are composed of a plurality of carrier parts 36a, - - - 36f.

The carrier part 136a constituting the fixed frame portion 134 has substantially a U-shaped structure having both front end portions bent downwardly, as viewed, the end portions being provided with distal ends to which pedestals 137a and 137b for bolt fastening are formed, respectively.

A pair of carrier parts 136b and 136c are connected to the front end sides of the U-shaped fixed frame portion 134, and these carrier parts 136b and 136c have outer (bilateral) end portions downwardly bent and are located to the lower sides of the front end portions of the fixed frame portion 134. These carrier parts 136b and 136c constitute a support shaft for rotatably supporting the rotatable frame portion 135, and the carrier parts 136b and 136c have inner ends to which lock pieces 138a and 138b are mounted to prevent the support shaft from falling out.

A carrier part 136d having substantially a T-shaped configuration for supporting the fixed frame portion 134 is connected to the lower side portion of the rear side end portion of the fixed frame portion 134. The support carrier part 136d is provided with a pedestal 137c for bolt fastening at the lower end portion of the downwardly directed T-shaped carrier part 136d in an attached state.

On the other hand, a rotatable carrier part 136e constituting the rotatable frame portion 135 has substantially a U-shaped structure to be disposed inside the U-shaped fixed frame portion 134, and in this arrangement, the fixed frame portion 134 constitutes an outer frame member and the carrier part 136e (rotatable frame portion 135) constitutes an inner frame member for the carrier 133. The distal front end portions of the U-shaped carrier part 136e are bent so as to provide ring shape portions which are to be engaged with the carrier parts 136b and 136c, respectively, as the support shaft. A reinforcing carrier part 136f having both ends bent downwardly in a shown and attached state is secured to the central lower portion of the rotatable carrier part 136e, this reinforcing carrier part 136f also serving as a bridge member.

An engaging piece 139 having an elastic property is attached to an upper central portion, i.e. horizontal upper bar-like portion, of the T-shaped support carrier part 136d. The engaging piece 139 is formed by bending a plate member to form an engaging recess 139a so as to provide an elasticity. The engaging recess 139a has a size suitable for receiving a bar-like end portion of the U-shaped carrier part 136e, which is fitted into this engaging recess 139a by applying a pressure from an upper side in an attached state as shown in FIG. 15.

Figure 12:
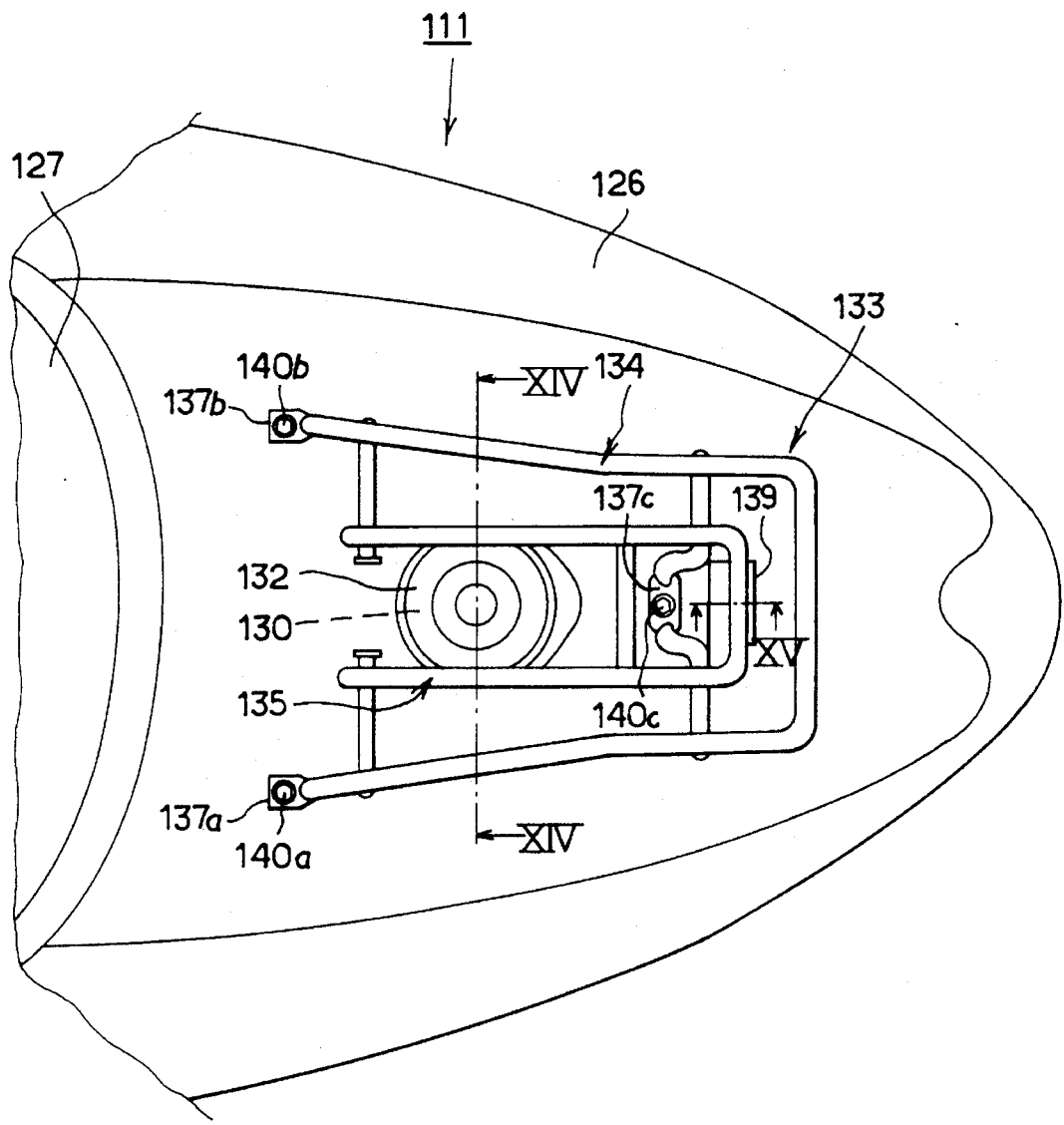
FIG. 12 is a plan view showing a state of the carrier of FIG. 1 being attached to a side cover of a scooter-type vehicle.
Figure 13:
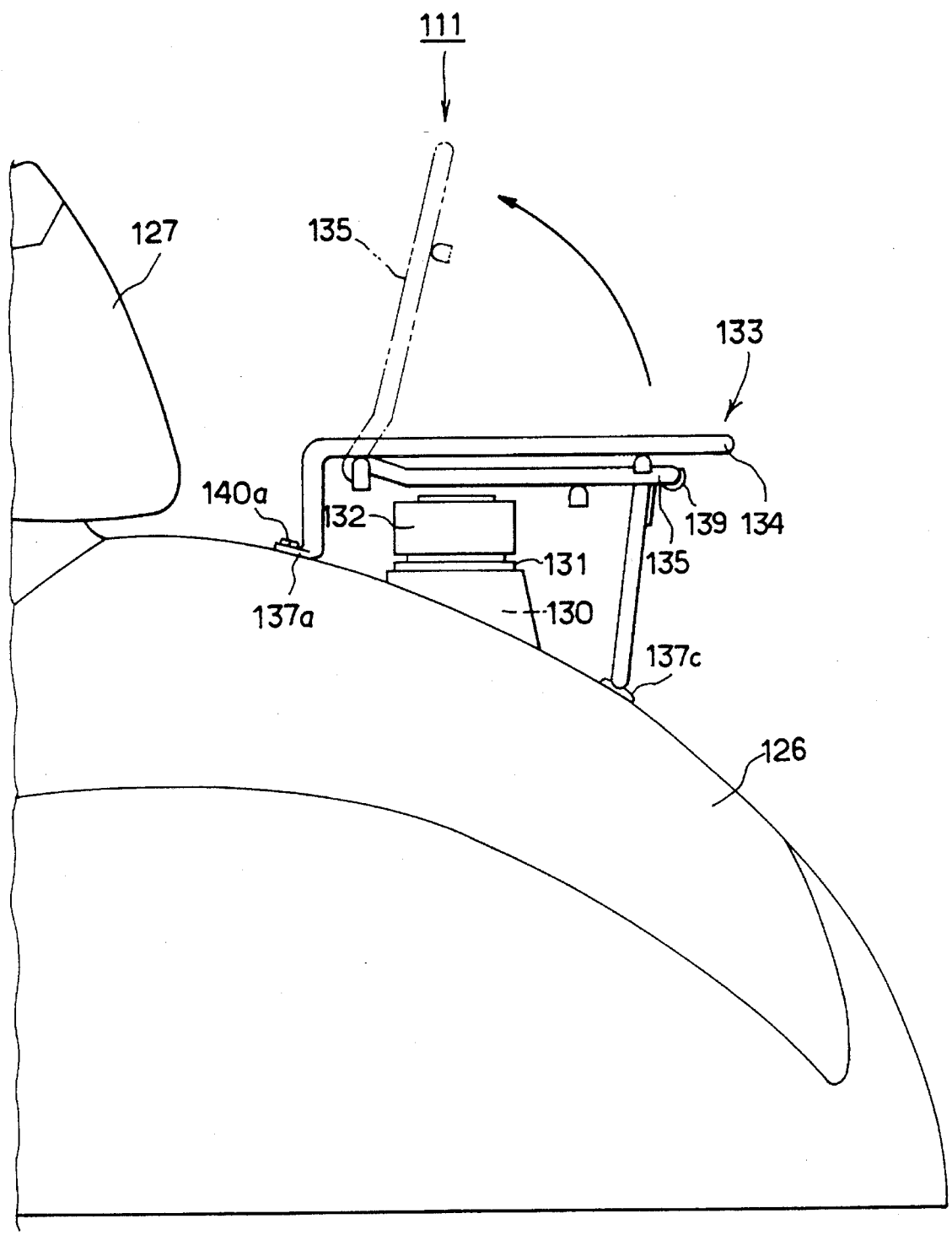
FIG. 13 is a side view of FIG. 12.
Figure 15:
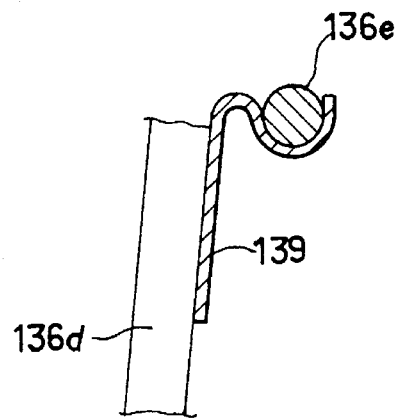
Figure 16A:
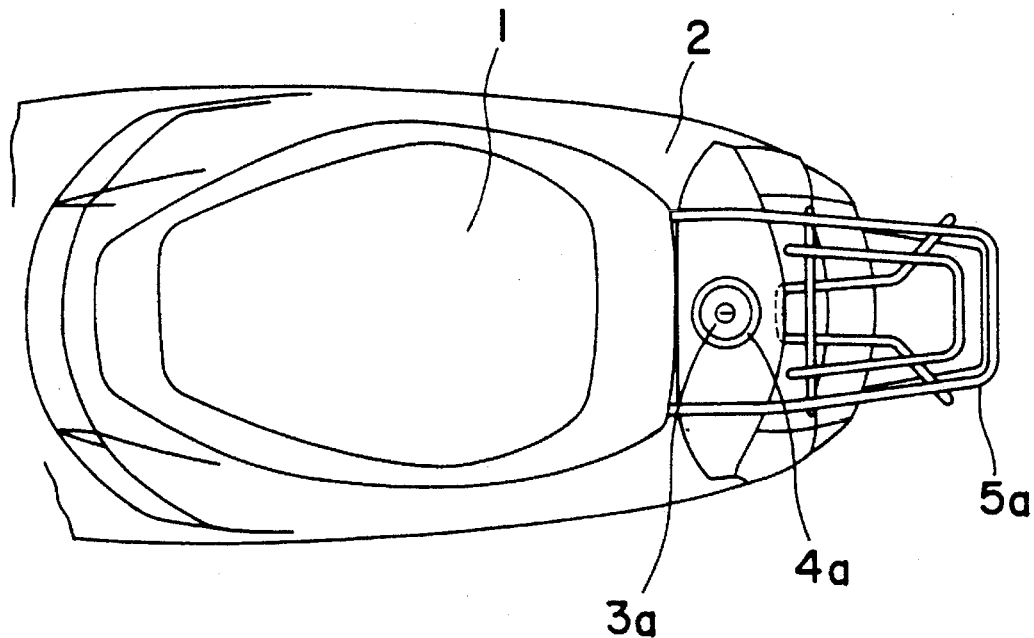
FIGS. 16A and 16B are plan views showing carrier mounting positions in the prior art.
Figure 16B:
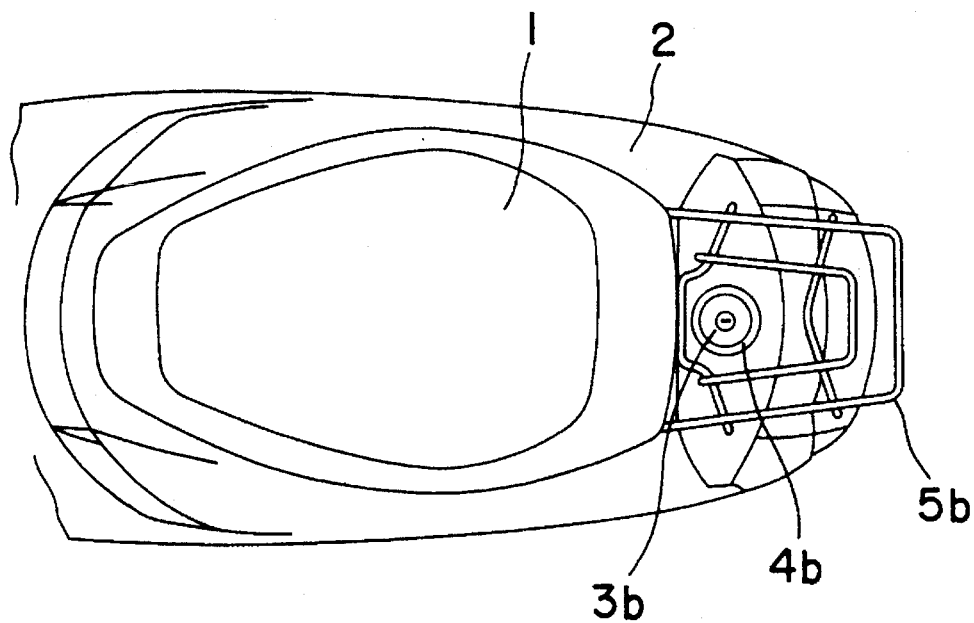

FIG. 12 is a plan view showing a state in which the carrier 133 of the structure described above is applied to the scooter-type vehicle 111 and FIG. 13 is a side view of FIG. 12, and FIGS. 14 and 15 are sectional views taken along the lines IVX—IVX and VX—VX of FIG. 12, respectively.

As can be seen from these figures, according to this embodiment of the present invention, the lateral distance between two facing portions of the U-shaped inner frame member 135 is substantially equal to or slightly smaller than an outer diameter of the fuel cap 132.

As shown in FIG. 14, the inner frame member 135 is positioned on a horizontal level, as attached to the vehicle, lower than that of the outer frame member 136a with height difference of δ so as to provide an inner recessed place between the inner and outer frame members when attached.

According to the second embodiment of the present invention, as shown in FIGS. 10 and 11, the respective carrier parts 36a to 36f forming the fixed and rotatable frame portions 134 and 135 are made of metal rod members, for example, and firmly assembled by means of welding, for example, thus forming the inner frame member and the outer frame member when assembled.

The carrier parts 136b and 136c are inserted with play through the ring portions of the rotatable carrier part 136e before welding to the fixed carrier part 136a, thus the the carrier part 136e, i.e. inner frame member, being rotatable about the carrier parts 136b and 136c, i.e. support shaft.

The fixed frame portion 134 of the carrier 133 is fixed, as shown in FIGS. 12 and 13, to the rear outer cover 126 at the rear portion of the seat 127 of the scooter-type vehicle through the seat portions 137a to 137c by means of bolts 140a to 140c. In this fixing operation, the rotatable frame portion 135 is positioned directly above the fuel cap 132 for the fuel inlet 130.

When fixed, the free end portion, righthand end portion, as viewed in FIG. 12, for example, of the rotatable frame portion 135 is firmly engaged with the engaging recess 139a of the engaging piece 139.

According to this embodiment, small baggage can be rested on the carrier directly above the fuel inlet, and when the fuel is supplied, only the inner frame member 135 can be rotated upward in an arrowed direction in FIG. 13 to easily access the fuel inlet. Furthermore, as shown in FIG. 14, since the inner frame member 135 is positioned on the horizontal level, as attached to the vehicle, lower than that of the outer frame member 136a with a height difference of δ, the carrier provides an inner recessed place between the inner and outer frame members when attached. Accordingly, when a small baggage is rested on the carrier 133, i.e. on the inner frame member 135, the outer frame member 136 can serves as a stopper member for the baggage.

The distal ends of the carrier parts 136b, 136c, 136d and 136f are bent downward in an L-shape as hook members to easily wind a cord, string or the like to thereby fix the baggage to the carrier.

In the second embodiment, the carrier is rotatable frontwardly with respect to the vehicle body, but the carrier may be constructed to be rotatable rearwardly or laterally.

As described above, the carrier for the scooter-type vehicle of the present invention is rotatably arranged directly above the fuel inlet, so that refuelling can be easily performed without removing the baggage from the carrier and, at the same time, a complicated lock mechanism for the cap of the fuel inlet is not required.

It is to be noted that the present invention is not limited to the described embodiments and many other changes and modifications may be made without departing the scope of the appended claims.

What is claimed is:

1. A carrier for holding baggage on a scooter-type vehicle, the vehicle having an outer cover on a body of the vehicle, at least a portion of the outer cover being located rearward of a rider's seat on the vehicle, the vehicle having a fuel tank located rearward of the rider's seat and beneath said cover, the vehicle having a fuel inlet port for the fuel tank extending through the portion of the outer cover and rearward of the rider's seat, and the vehicle being adapted to receive the carrier above the portion of the outer cover, the carrier comprising:

a carrier base that is a fixed frame portion adapted to be fixed to the portion of the outer cover, said carrier base comprising a U-shaped structure having opposite ends adapted to be secured to the portion of the outer cover and a central portion intermediate said opposing ends, hinge means connected to the central portion of the carrier base; and a rotatable frame portion adapted to be disposed directly above the fuel inlet port, said rotatable frame portion including:

a first carrier part connected to the hinge means and thereby rotatably connected to the carrier base, the first carrier part having opposing distal bent end portions adapted to extend downward, and a second carrier part having a U-shaped frame structure having opposing distal bent ends and an intermediate section therebetween, said intermediate section being secured to the first carrier part, said distal bent ends of said second carrier part extending downwardly and abutting the portion of the outer cover when the rotatable frame portion is rotated from a first position to a second position.

2. A carrier according to claim 1, wherein cushioning members are attached to the distal ends of the second carrier part.

3. A carrier according to claim 1, wherein said rotatable frame portion further includes a third carrier part secured to a lower side surface of the second carrier part near the distal bent ends of the second carrier part, said third carrier part having bent end portions extending downward when the carrier is attached to the outer cover, and a fourth carrier part having a U-shaped structure secured to the first and third carrier parts.

4. A carrier according to claim 3, wherein said first, second, third and fourth carrier parts are welded together to form the rotatable frame portion of the carrier.

5. A carrier according to claim 3, wherein said first, second, third and fourth carrier parts are positioned at different levels relative to the outer cover when the carrier is mounted on the outer cover.

6. A carrier according to claim 3, wherein said U-shaped fourth carrier part has end portions secured to the first carrier part, a central portion secured to the third carrier part, and a striker secured to the central portion of the U-shaped fourth carrier secured to and extending downwardly from said central portion of said fourth carrier part.

7. A carrier according to claim 6, wherein said striker is adapted to engage a lock mechanism adapted to be disposed inside the outer cover.

* * * * *